Patented Aug. 11, 1953

2,648,686

UNITED STATES PATENT OFFICE 2,648,686

PROCESS FOR REDUCING STEROID KE-
TONES TO THEIR CORRESPONDING
METHYLENE ANALOGS

Huang Minlon, Metuchen, N. J., assignor to
Merck & Co., Inc., Rahway, N. J., a corpora-
tion of New Jersey No Drawing. Application December 17, 1949,
Serial No. 133,677

4 Claims. (Cl. 260—397.1)

1

This invention is concerned with novel proc-
esses generally applicable for reducing carbonyl
groupings in organic compounds. More particu-
larly it relates to an improved method for the
commercial manufacture of compounds contain-
ing methylene groupings from the correspond-
ing aldehydes and ketones.

One established general procedure applicable
for the reduction of aldehydes and ketones to
their methylene analogs is the Wolff-Kishner re-
duction. In the usual procedure of the Wolff-
Kishner reduction the carbonyl compound is con-
verted to the corresponding hydrazone, which is
heated, at elevated temperature and under sub-
stantially anhydrous conditions, with a lower
aliphatic alcoholic solution of the corresponding
sodium alcoholate. One disadvantage of this
method is that it is usually carried out in the
presence of a volatile alcohol, and thus neces-
sitates the use of high pressure equipment. In
one modification of this procedure, which avoids
the need for high pressure apparatus, the car-
bonyl compound is heated for a period of about
20 to 100 hours, with 100% hydrazine hydrate
and a solution prepared by dissolving a large
amount of metallic sodium in an extremely large
volume of a high-boiling solvent. The use of
such large amounts of metallic sodium and high-
boiling solvent, and the prolonged reaction pe-
riods required, are serious disadvantages to the
commercial use of this process. Alternatively
the carbonyl compound can first be converted
to the corresponding hydrazone by conventional
methods, as for example, by reaction with hy-
drazine hydrate in the presence of an aqueous
acidic medium, and the hydrazone then heated
with a solution of sodium alcoholate in an an-
hydrous high-boiling solvent. When this two-
step procedure is employed, however, it is neces-
sary to separate the hydrazone from the other
components in substantially anhydrous form,
prior to reacting said hydrazone with the solu-
tion of sodium alcoholate in the anhydrous high-
boiling solvent. The yield obtainable by this
two-step method has therefor generally been lim-
eted to about 60–70% of theory. These previous
modifications of the Wolff-Kishner reaction are
generally unsatisfactory for reducing certain car-
bonyl compounds, as for example, the steroid
ketones. Furthermore, they all have the disad-
vantage of requiring the use of costly reagents:
metallic sodium or a sodium alcoholate (obtained
by reacting metallic sodium with the appropri-
ate alcohol); and anhydrous hydrazine hydrate.

The present inventor has disclosed and claimed

2 in U. S. Patent No. 2,471,697, issued May 31, 1949
a novel and improved procedure whereby the car-
bonyl groupings in aldehydes and ketones can be
reduced by causing the carbonyl compound to re-
act with hydrazine hydrate and an alkali metal
hydroxide in the presence of a high-boiling sol-
vent. This procedure, as set forth in said Patent
No. 2,471,697, possesses unexpected and commer-
cially advantageous features not possessed by the
previously-known methods for reducing carbonyl
compounds. It is now discovered that aldehydes
and ketones can be reduced to their methylene
analogs utilizing, instead of the corrosive liquid
hydrazine hydrate, hydrazine sulfate. Hydrazine
sulfate, being a solid, is easier to handle than hy-
drazine hydrate and is also less expensive.

It is a preferred feature of this invention that
the inexpensive hydrazine sulfate can be em-
ployed in conjunction with the readily available
and inexpensive alkali metal hydroxides, such as
sodium hydroxide, potassium hydroxide, and the
like, instead of the costly alkali metal alcoholates,
or the costly and hazardous sodium metal.

The reduction of aldehydes and ketones ac-
cording to this improved procedure utilizing hy-
drazine sulfate and alkali metal hydroxides can
be accomplished by simply heating the aldehyde
or ketone with a mixture of hydrazine sulfate,
alkali metal hydroxide and high-boiling solvent
at a temperature of at least about 190° C. It has
been found that, when the reactants are heated
at a temperature of about 190–200° C., the re-
duction of the aldehyde or ketone is substantially
complete in about 2–4 hours.

The high-boiling solvent employed should boil,
under atmospheric pressure, at a temperature of
about 200° C., or higher, and should be a solvent
for the alkali metal hydroxide used. The alco-
holic solvents, such as polyethylene glycols, are
especially suitable as solvents in this reaction and
it is presently preferred to employ diethylene gly-
col or triethylene-glycol.

The reaction between hydrazine sulfate, alkali
metal hydroxide and carbonyl compound results
in the production of water which ordinarily
lowers the boiling point of the reaction mixture
at atmospheric pressure. In order to attain the
desired temperature of 190° C., the mixture can
of course be heated under pressure. It is ordi-
narily preferred to conduct the reaction at atmos-
pheric pressure, however, and this is readily per-
formed by heating the reactants in an open vessel
under which conditions the water formed by the
reaction evaporates until the boiling point of the
reaction mixture reaches 190–200° C. If desired, the reaction mixture can be heated under reflux for a period of approximately one hour prior to evaporating the low boiling components therefrom. Longer or shorter heating periods can be used and the reaction may be carried out, providing the reaction between the hydrazine and the carbonyl compound is rapid, by mixing the components and evaporating directly, whereby formation of the hydrazone and removal of volatile components takes place simultaneously.

The time of heating following the evaporation of the low-boiling components varies somewhat dependent upon the compound being reduced but in no case has it been found necessary to employ a heating time in excess of about 3 to 4 hours. Some carbonyl compounds are completely reduced after a substantially shorter reaction period. The elevated temperature employed during the heating period following the distillation is dependent on the particular compound, but it is ordinarily preferred to employ a temperature of at least about 190° C., although lower temperatures can be utilized if desired, where the reduced product boils at a temperature below 190° C. When the reduced product is a low-boiling compound it can sometimes be distilled directly from the reaction mixture or else can be recovered by diluting the reaction mixture with water or dilute acid and filtering or extracting with an appropriate water-immiscible solvent such as a hydrocarbon solvent or a dialkyl ether. When the starting material or reaction product is very low-boiling, or volatile with steam, a water separator can be used for removing the water instead of simple evaporation. It has often been found convenient to dilute the alkaline reaction mixture with water, and to recover the reduced compound by precipitation and filtration, or by extraction with a solvent.

The herein described process is generally applicable for reducing aliphatic, aromatic, araliphatic, and steroid ketones, aldehydes, and keto acids to the corresponding methylene analog. No compound within this general group tried by applicant has failed to give the desired reaction, and, in each case a yield very near to that theoretically obtainable has resulted, although in certain cases the substituent groupings may themselves be hydrolyzed or reduced.

For example, aliphatic ketones, such as cyclohexanone, or aromatic ketones, such as benzophenone, and the like, are converted by this improved procedure to the corresponding hydrocarbon in yields of over 80% of theory. The aromatic-aliphatic ketones, such as β-(p-phenoxybenzoyl)-propionic acid, γ-(p-phenoxybenzoyl)-butyric acid, and the like, are converted to the corresponding methylene products in yields of over 90% of theory.

When a carbonyl compound containing ester groupings, such as acylated hydroxyl or esterified carboxyl groupings, (for example, acyloxy or carboalkoxy radicals), or ether groupings such as alkoxy, is reacted according to applicant's process, the carbonyl grouping is reduced to the corresponding methylene group and the ester or ether groups are generally hydrolyzed at the same time. Keto acids containing aryl ether groupings such as β-(p-phenoxybenzoyl)-propionic acid, γ-(p-phenoxybenzoyl)-butyric acid, and the like, are converted to the corresponding aroxy-substituted acid, wherein the keto radical has been reduced to a methylene grouping. When aldehyde or keto compounds containing an alkyl ether radical, as for example, vanillin, methyl vanillin, β-(3-methoxy-benzoyl)-propionic acid, and the like, are reduced according to applicant's process the ether linkage is hydrolyzed to hydroxy whereas the keto or aldehyde grouping is converted to the corresponding methylene radical.

The steroid ketones, such as dehydrocholic acid, methyl 3-benzoxy-12-keto-cholanate and the like, can be reduced to the corresponding methylene compounds, often in nearly quantitative yield. This is of particular importance in the case of 3-12-dihydroxy-7-keto-cholanic acid, which can be reduced by the herein described process to yield desoxycholic acid (3,12-dihydroxy-cholanic acid), an important intermediate in the synthesis of Kendall's Compound E, in nearly quantitative yield. The fact that the steroid ketones can be thus reduced in high yield is indeed surprising in view of the fact that it has been repeatedly observed that steroid ketones and many other carbonyl compounds, when reduced by the usual Wolff-Kishner procedure, either do not yield the normal methylene compounds or give a mixture of methylene and carbinol compounds; the keto group of the steroids, especially the $C_3$-ketone group, yield chiefly the corresponding carbinol. (See Dutcher et al.: J. A. C. S. 61, 1922 (1939).)

The following examples illustrate methods of carrying out the presently invented process but it is to be understood that these examples are given by way of illustration and not of limitation.

EXAMPLE 1

*Cholanic acid from dehydrocholic acid*

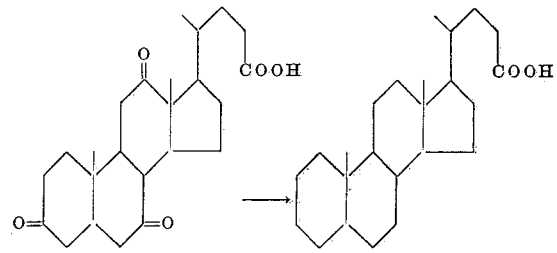

A mixture of 2 g. dehydrocholic acid, 3.9 g. hydrazine sulfate, 7 g. potassium hydroxide and 70 cc. triethylene glycol was refluxed for about 1 hour. The condenser was then removed to allow water to evaporate, and when the temperature reached 200° C., the mixture was refluxed at this temperature for about 2 hours. The mixture was then cooled, diluted with water, acidified with hydrochloric acid and extracted with ether. After washing and drying the ether solution, the ether was evaporated, and the solid residue was recrystallized from dilute acetone to give a crude cholanic acid of M. P. 153–155° C. Pure cholanic acid of M. P. 162–164° C. was obtained by a second recrystallization from acetone.

EXAMPLE 2

$\Delta^5$-*Pregnenol from* $\Delta^5$-*pregnenol-3-one-20*

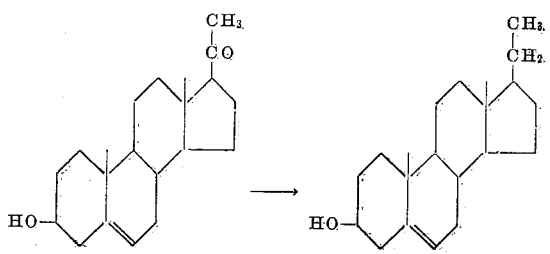

A mixture of 2 g. of $\Delta^5$-pregnenolone, 1.8 g. hydrazine sulfate, 8 g. potassium hydroxide and 80 cc. diethylene glycol was refluxed for about 1 hour. The condenser was removed to allow water to evaporate, and when the temperature reached about 190° C., the reaction mixture was refluxed at this temperature for about 3 hours. After cooling and dilution with water, the mixture was extracted with ether, and from the ether solution $\Delta^5$-pregnenol was obtained, which after recrystallization from methanol, had a melting point of 131–132° C.

Modifications may be made in carrying out the present invention without departing from the spirit and scope thereof. Insofar as these changes and modifications are within the scope of the annexed claims, they are to be considered as part of my invention.

I claim:

1. The process of reducing a steroid ketone to the corresponding methylene derivative, which comprises mixing said steroid ketone with hydrazine sulfate, an alkali metal hydroxide, and a polyethylene glycol, heating the resulting mixture until the temperature of the mixture reaches an elevated temperature of at least 190° C., and maintaining the mixture at said elevated temperature.

2. The process of preparing desoxycholic acid which comprises mixing 3,12-dihydroxy-7-keto-cholanic acid with hydrazine sulfate, an alkali metal hydroxide and a polyethylene glycol, heating the resulting mixture until the temperature of the mixture reaches an elevated temperature of at least 190° C., and maintaining the mixture at said elevated temperature.

3. The process of preparing cholanic acid which comprises mixing 3,7,12-triketo cholanic acid with hydrazine sulfate, potassium hydroxide and triethylene glycol, heating the resulting mixture under reflux for a period of approximately one hour, evaporating low-boiling components from the reaction solution until the boiling point of said solution reaches an elevated temperature of approximately 200° C., and heating the resulting solution at said elevated temperature for a period of about two to three hours.

4. The process of preparing $\Delta^5$-pregnenol which comprises mixing $\Delta^5$-pregnenolone with hydrazine sulfate, potassium hydroxide and diethylene glycol, heating the resulting mixture under reflux for a period of approximately one hour, evaporating low-boiling components from the reaction solution until the boiling point of said solution reaches an elevated temperature of approximately 190° C., and heating the resulting solution at said elevated temperature for a period of about 2–3 hours.

HUANG MINLON.

References Cited in the file of this patent

UNITED STATES PATENTS

| Number | Name | Date |
|--------|------|------|
| 2,471,697 | Minlon | May 31, 1949 |

OTHER REFERENCES

Todd, Jour. Am. Chem. Soc., 71, 1353–1355 (1949).

Adams et al., Organic Reaction, vol. IV, pp. 380–383 (1948), published by John Wiley and Sons, New York, N. Y.